United States Patent [19]

Gemin

[11] 4,431,994

[45] Feb. 14, 1984

[54] COMBINED RADAR/BAROMETRIC ALTIMETER

[75] Inventor: Robert A. Gemin, Beavercreek, Ohio

[73] Assignee: The United States of America as represented by the Secretary of the Air Force, Washington, D.C.

[21] Appl. No.: 260,879

[22] Filed: May 6, 1981

[51] Int. Cl.³ .................... G01J 13/08; G06F 15/50
[52] U.S. Cl. .................... 343/12 A; 340/970
[58] Field of Search ........ 340/27 AT, 27 NA, 815.02, 340/27 R; 343/12 A, 50 P, 7 ED, 5 R, 112 A, 7 TA; 364/433, 562; 73/178 T, 178 R

[56] References Cited

U.S. PATENT DOCUMENTS

| | | | |
|---|---|---|---|
| 2,930,035 | 3/1960 | Altekruse | 343/7 TA |
| 3,140,483 | 4/1959 | Sikora et al. | 343/7 ED |
| 3,140,483 | 5/1964 | Sikora et al. | 343/7 ED |
| 3,936,797 | 2/1976 | Andresen, Jr. | 343/12 A X |
| 3,947,808 | 3/1976 | Bateman | 364/433 X |
| 3,958,108 | 5/1976 | Shimamura | 364/562 X |
| 4,016,565 | 4/1977 | Walker | 343/12 A X |
| 4,292,671 | 9/1981 | Evans et al. | 364/433 |
| 4,319,218 | 3/1982 | Bateman | 340/27 AT |

Primary Examiner—Sal Cangialosi
Assistant Examiner—K. R. Kaiser
Attorney, Agent, or Firm—Donald J. Singer; Bernard E. Franz

[57] ABSTRACT

An altitude sensing arrangement which combines the advantages of a barometric altimeter with a radar altimeter. The apparatus monitors the radar altimeter's associated radar validity signal and selects the radar altimeter's reading when the validity signal indicates a valid condition. Alternately, when the validity signal does not indicate a valid condition, the invention computes the difference in barometric altitude since the last valid radar altimeter reading and sums this difference with the last valid reading from the radar altimeter to produce a combined altitude reading.

5 Claims, 1 Drawing Figure

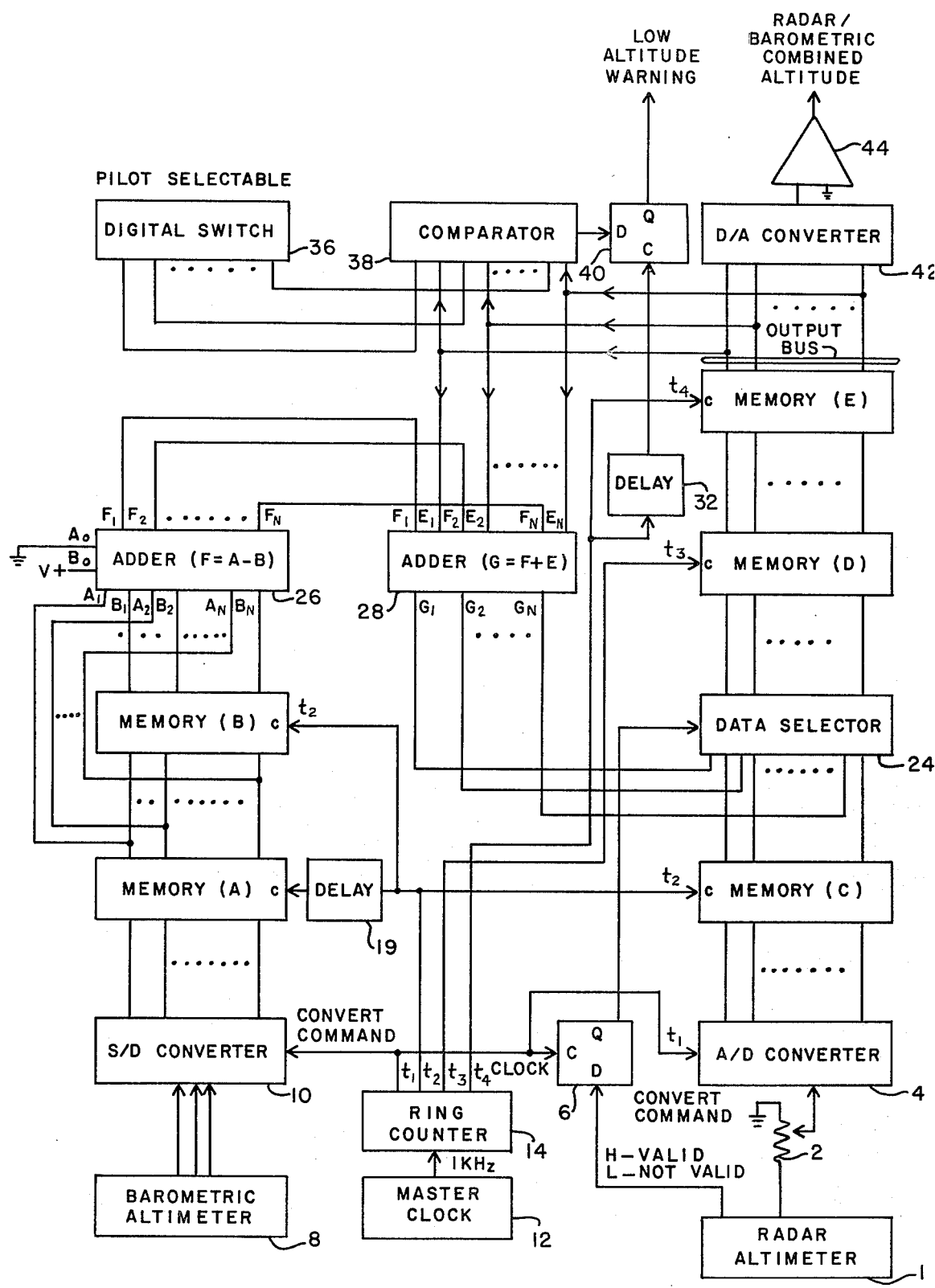

in patent 4,431,994

COMBINED RADAR/BAROMETRIC ALTIMETER

RIGHTS OF THE GOVERNMENT

The invention described herein may be manufactured and used by or for the Government of the United States for all governmental purposes without the payment of any royalty.

BACKGROUND OF THE INVENTION

Broadly speaking, this invention relates to altitude sensing means suitable for use with altitude control systems or with pilot warning systems for aircraft. More particularly, in a preferred embodiment, this invention relates to a barometric altimeter combined with a radar altimeter.

A common type of altimeter is the pressure responsive altimeter which includes an aneroid barometer arrangement having expansible bellow means. Other types of altimeters have been developed based upon the principle of radar which utilizes reflected signals from the surface of the earth. These radar altimeters have means for sensing and measuring the absolute altitude above the earth's surface.

A barometric altimeter measures the pressure of atmospheric air which can be used for determining the true altitude above sea level but cannot detect actual height above terrain. In contrast, a radar sensing device accurately measures the actual height above the terrain but cannot provide reliable readings during some flight attitude conditions. For example, it is well recognized that sharp banks, dives and climbing attitudes of an aircraft will cause unreliable altimeter signals from a radar unit due to the aircraft's pitch and roll angles being greater than the radar altimeter's cone of operation. Because of this, radar altimeters generally include an indicator of whether the reading is valid or invalid. Furthermore, a failure in radar signals will cause a radical change in an altitude control system, especially during a low altitude, terrain following flight.

It has been proposed that barometric and radar altitude sensors be combined so that the advantages of both can be utilized while the disadvantages of the individual sensors are neutralized. For example, U.S. Pat. No. 3,140,483 combines barometric and radar altimeters using complex analog devices. While this patent is good for its purpose of generating an altitude error signal for driving an aircraft control surface, it does not provide a true and absolute reading of altitude above ground.

SUMMARY OF THE INVENTION

One of the principal objects of this invention, therefore, is to provide an altitude sensing arrangement which provides an output reading of the absolute altitude above the earth's surface, even during periods when the radar altimeter output is not valid.

A feature of the invention relates to an arrangement incorporating a barometric altitude sensing system with a radar altitude sensing system such that the barometric sensor provides an alternate altitude sensor to update the altitude reading in the event that the radar sensor fails to deliver a valid signal. In this manner, the output continues to indicate the altitude above the earth's surface relative to the surface level at the last valid radar altimeter output.

Another feature of the invention is the provision of an altitude sensing system having in combination a barometric pressure altimeter and a radar altimeter with digital logic to compare a pilot selected altitude with a true altitude above the earth's surface.

Yet another feature of the invention is the provision of an apparatus to trigger an electrical warning signal whenever the true altitude falls below the pilot selected altitude.

DESCRIPTION OF THE DRAWING

The single FIGURE is a functional block diagram of one embodiment of the radar-barometer altimeter circuit according to the invention.

DETAILED DESCRIPTION OF THE INVENTION

The drawing illustrates the preferred embodiment of the invention. Radar altitude as a linear DC analog signal and an associated validity sign are provided by a commercial or military radar altimeter 1, for example, a Honeywell type AN/APN-194 or Sunstrand type AVH-5 radar altimeter. If necessary the DC analog voltage may be scaled by a potentiometer 2 in order to make the signal compatible with a connecting analog-to-digital converter 4. Analog-to-digital converter 4 converts the scaled analog altitude signal into a digital representation upon a convert command at time $t_1$. At the same time, $t_1$, the validity status of the radar altimeter is stored in a D-type flip-flop 6.

A barometric altimeter indicated at 8 may be of the type widely used on aircraft, such as an ARINC 565, which provides a synchronous, 3 wire, AC analog signal. This signal is applied to a corresponding synchronous motor attached to the cockpit altimeter instrument to provide precise meter movement. In the invention, the three synchronous, AC analog signals are connected to a synchro-to-digital (S/D) converter to provide a digital representation of barometric altitude. The S/D converter (a specialized A/D converter) may be of any suitable commercially available design, such as, for example, the Computer Conversion Corp. Model SDC 40. The digital representation is then fed to a memory (A) where it is continually updated.

A clock 12 and a ring counter 14 provide clocking pulses $t_1$, $t_2$, $t_3$, and $t_4$ on four strobe lines which are pulsed at times separated by the clock period. Typically, a clock frequency would be on the order of 1 KHz which would result in the strobe pulses being separated by 1 millisecond. Although other values may be used, the strobe separation must be sufficient to prevent accepting or changing data prematurely.

When the ring counter 14 initializes time $t_2$, a memory (C) stores the digital representation of radar altitude provided by the analog-to-digital converter 4. Memory (A) stores the digital representation provided by the synchro-to-analog converter 10 at the time of $t_2$ plus a finite delay time imposed by a delay circuit 19. Any delay is acceptable so long as it does not extend to time $t_3$. Also at time $t_2$, a memory (B), connected in series with memory (A), stores the barometric altitude which was stored in memory (A) during the previous time cycle.

The output of memory (A) through signal line A, together with the inverted output of memory (B) through signal line B, are inputted to an adder 26. The adder 26 is connected to a positive source voltage, V+, and is electrically grounded in such a manner to provide the proper sign bit. As a result, the function of adder 26 becomes subtraction of memory (B) contents from memory (A) contents by making memory (B) contents appear as a negative one (−1's) complement. The output of adder 26 is, therefore, the −1's complement of the barometric altitude change over the time between two t₁ strobes. As will be discussed in greater detail below, the barometric altitude change will be made available for addition to the radar or radar/barometric combined altitude.

The information contained in memory (C) is fed into data selector 24 which passes the information to memory (D) when the trigger signal from the D type flip-flop 6 applied to data selector 24 is "high". A "high" signal is the proper output of the D type flip-flop 6 when the radar altimeter validity signal is "high" (i.e., valid) at time t₁.

The data from the data selector is stored in memory (D) at time t₃. The same data is transferred directly to memory (E) at time t₄. Two memories are utilized to prevent the data being stored by memory (E) from changing when the output of memory (D) changes.

If the radar altimeter validity signal is "low" (i.e., not valid) at time t₁, the D type flip-flop 6 will not trigger data selector 24 to pass the contents of memory (C) on to memory (D). Instead, the output of adder 26, which represents the barometric altitude change since the last time t₁, is fed through input signal line F to another adder 28. Information stored in memory (E), which contains the digital representation of radar altitude is fed through signal line E to adder 28 and summed with the output of adder 26. Thus, the resultant output of adder 28 (indicated in the drawing as signal line G) is the barometric altitude change added to the last valid radar altitude. This combined radar/barometric altitude is fed into data selector 24 and is the information stored in memory (D) when the radar altimeter validity signal caused the D type flip-flop 6 to generate a "low" trigger signal to data selector 24. Since memory (E) is directly connected to memory (D), the combined radar/barometric altitude information will be transferred to memory (E) at subsequent time t₄. As a result, the signals on the output bus of memory (E) could contain either combined radar/barometric altitude data or solely radar altitude data, either of which would be fed into adder 28 for updating during the next time cycle.

Memory (E), which contains the digital representation of radar/barometric altitude data, is directly connected to digital-to-analog converter 42. Digital-to-analog converter 42 converts the digital altitude information into an analog DC output, which is then fed into amplifier 44, where the analog signal is buffered and scaled producing a final output signal. The scaling parameter is determined by the altitude indicator utilized, such as a cockpit altitude indicator or other system such as a ground proximity warning system (GPWS).

The output of memory (E) is also connected to comparator 38, together with a signal from pilot selectable digital switch 36. The pilot, using digital switch 36, selects the altitude which he desires to maintain. Comparator 38 compares the combined altitude stored in memory (E) with the altitude selected by the pilot using digital switch 36. Comparator 38 will output a "high" signal if the selected altitude is higher than the radar and barometric combined altitude. The comparator 38 output signal is connected to a D type flip-flop 40, which is clocked at time t₄, and delayed by time delay circuit 32. Any delay time may be used so long as it does not extend the time to t₁. A delay is needed to insure that the data of memory (E) is stabilized. The resulting output of the D type flip-flop 40 will be high and will trigger a cockpit warning signal if the combined radar/barometric altitude is below the pilot selected altitude.

Delay circuits 19 and 32 could be implemented by pairs of inverters, or by one shot multivibrators. Adders 26 and 28 can be implemented by four-bit adders, while the memories could utilize Hex or Quad D flip-flops. The data selector can be implemented by a Quad two-line to one-line data selector.

In summary, the output signal of amplifier 44 is an analog signal of height above terrain, which is solely radar altitude if the radar altimeter signal is valid. When the radar altitude signal becomes invalid, the last valid radar altitude, which is stored in memory (E), is added to the change in barometric altitude since the last valid radar altitude was stored. This combined altitude is then stored in memory (E), and the output signal of amplifier 44 then becomes radar and barometric combined altitude.

Thus, while preferred constructional features of the invention are embodied in the structure illustrated herein, it is to be understood that changes and variations may be made by the skilled in the art without departing from the spirit and scope of the invention.

I claim:
1. A method for supplying altitude signals to an output bus using radar and barometric altimeters, comprising the steps of:
   a. selecting the altitude signals from the radar altimeter for output to the output bus if a validity indicator shows them to be valid;
   b. computing the change of altitude from the barometric altimeter over a given unit of time;
   c. adding said change to the altitude signals on said output bus to provide corrected altitude signals; and
   d. if the radar altitude signals are not valid, alternatively selecting said corrected altitude signals for output to the output bus;
   the valid or not valid status of the radar altititude signals being used as the sole criteria whether to select the altitude signals from the radar altimeter or the corrected altitude signals.

2. Apparatus for determining the altitude of an aircraft with respect to the underlying terrain, for use with a radar altimeter having an associated validity signal output, and a barometric altimeter, and providing output data for an altitude indicator, said apparatus comprising:
   a radar input memory coupled to the radar altimeter, a barometric input memory coupled to the barometric altimeter, a validity bistable device coupled to said validity signal output, timing means which produces timing signals in cycles recurring at fixed intervals;
   the timing means having connections with signals effective during each cycle to load radar altitude in the radar input memory, the validity signal condition in the validity bistable device, and barometric altitude data in the barometric input memory;
   an output memory having an output to an output bus which is coupled to supply said output data to said altitude indicator, a control input from the timing means to the output memory;
   data select means having a control input from the validity bistable device, data input means from the radar input memory, and data output means coupled to the output memory, the data select means being enabled during every cycle in which the state of the validity bistable device indicates that the radar altitude data is valid to cause altitude data to be transferred from the radar input memory to the output memory, so that when the radar altitude data is valid the output data on the output bus represents solely the radar altimeter output;

a second barometric memory having input connection means from the barometric input memory and the timing means enabled during each cycle before current cycle data is loaded into the barometric input memory to transfer the preceeding cycle data from the barometric input memory to the second barometric memory;

adder means having positive data inputs from the barometric input memory and the output bus, a negative input from the second barometric memory, and a data output to a second data input means of the data select means;

the data select means being alternatively enabled during cycles in which the state of the validity bistable device indicates that the radar altitude data is not valid to cause data to be transferred from the adder means output to the output memory, so that when the radar altitude data is not valid the output data on the output bus represents essentially the last valid radar altimeter output updated by the change of the barometric altimeter output;

the valid or not valid status of the radar altitude signals being the sole criteria during each cycle as to whether to select the altitude signals from the radar altimeter or from the adder means.

3. The apparatus of claim 2, wherein the coupling between the data select means and the output memory includes a buffer memory, with a control connection to the timing means, the buffer memory and output memory being enabled by the timing means during each cycle to load data from the data select means into the buffer memory and subsequently from the buffer memory into the output memory to ensure that the data is stable before loading it into the output memory.

4. The apparatus of claim 3, further including an analog-to-digital converter coupled between the radar altimeter and the radar input memory, a synchronous to-digital converter coupled between the barometric altimeter and the barometric input memory, the data being handled in the apparatus in digital form; and wherein said timing means comprises a master clock driving a ring counter, and delay means, the ring counter providing first, second, third and fourth strobe pulses in sequence, with the first strobe pulse supplied to the analog-to-digital and synchronous to-digital converters, the second strobe pulse supplied to the radar input memory, to the second barometric memory, and via the delay means to the barometric input memory, the third strobe pulse supplied to the buffer memory, and the fourth strobe pulse applied to the output memory.

5. The apparatus of claim 4, further including a pilot selectable digital switch for providing a desired altitude in digital format, a comparator means having inputs from said digital switch and from said output bus for comparing said inputs and generating an output signal if the output data on the output bus is less than the setting of the digital switch; a second bistable device having one input connected to the output of the comparator means and a control input from the timing means for generating a low altitude warning signal, the control input being the fourth strobe pulse via second delay means.

* * * * *